T. SLOPER.
APPARATUS AND METHOD FOR HANDLING RUBBER GOODS.
APPLICATION FILED JUNE 17, 1921.

1,399,898.

Patented Dec. 13, 1921.
3 SHEETS—SHEET 1.

Inventor
Thomas Sloper
by Bakewell Byrnes & Parmelee
his Attorneys

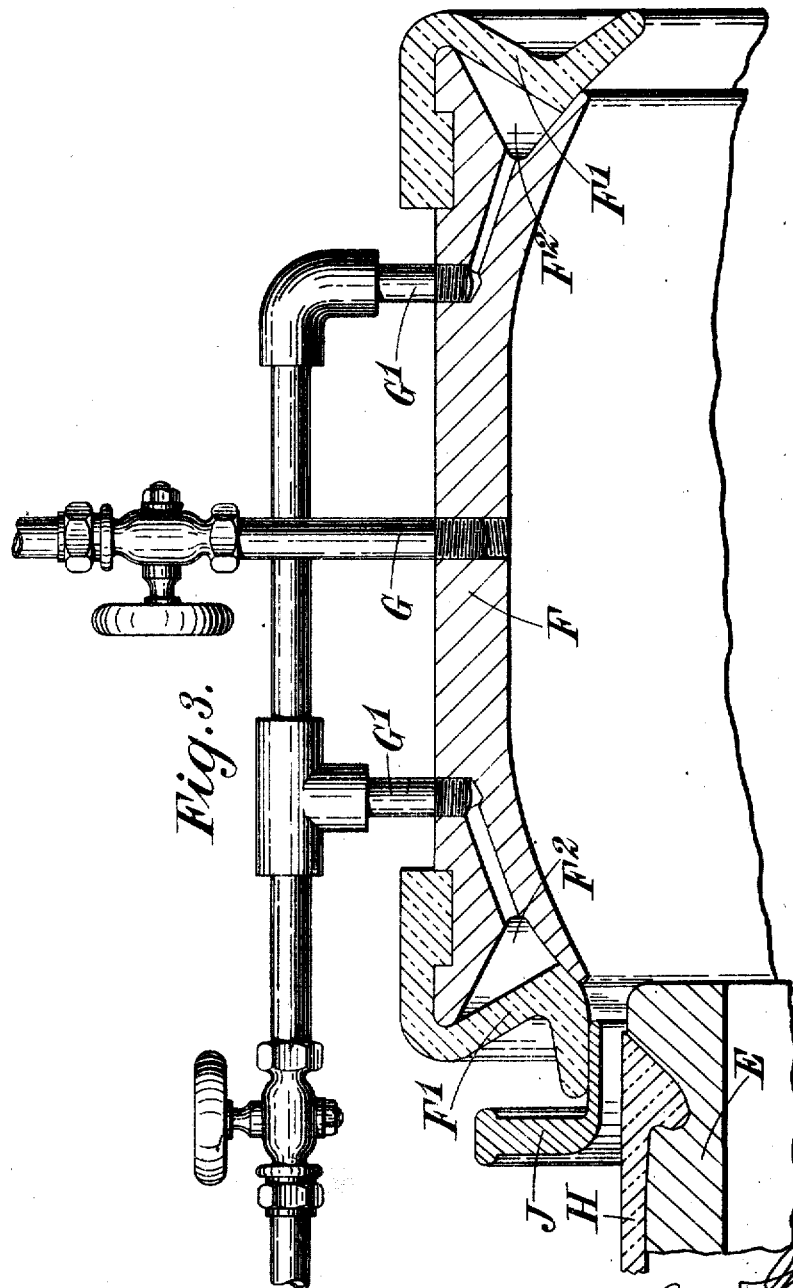

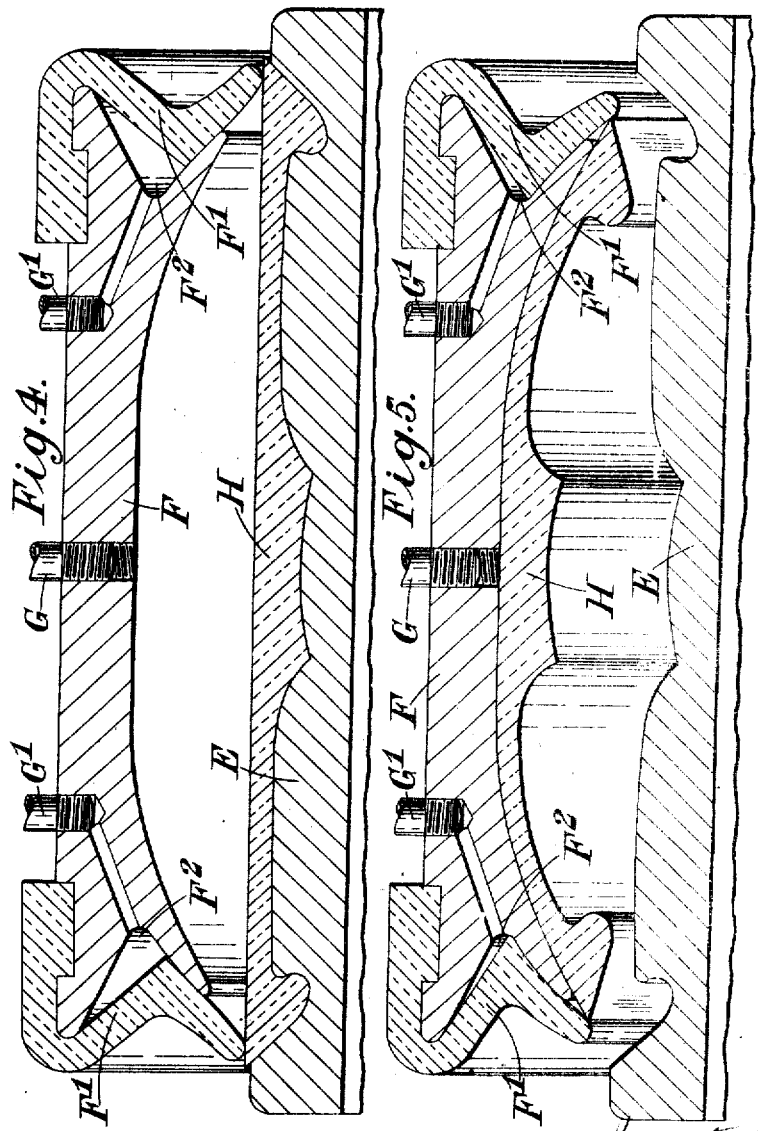

UNITED STATES PATENT OFFICE.

THOMAS SLOPER, OF DEVIZES, ENGLAND.

APPARATUS AND METHOD FOR HANDLING RUBBER GOODS.

1,399,898.   Specification of Letters Patent.   Patented Dec. 13, 1921.

Application filed June 17, 1921. Serial No. 478,319.

*To all whom it may concern:*

Be it known that I, THOMAS SLOPER, a subject of the King of England, residing at Devizes, Wiltshire, England, have invented certain new and useful Improvements in Apparatus and Methods for Handling Rubber Goods, of which the following is a specification.

This invention is for an improved apparatus for use in the manufacture of rubber goods and a method of handling such goods during manufacture, and has particular reference to a method for removing goods from the molds in which they are vulcanized. As is well known, rubber goods have a tendency to adhere to the metal molds, so that even where the shape of the goods is such that the mold could be made in one part, it often has to be made in several parts to assist the removal of the article, and this makes the mold more expensive than would otherwise be the case, for example, in the manufacture of tire-bands, that is tires built up in the flat, prior to their being shaped to receive the inner tube, the mold takes the form of a drum having a channel or channels in its periphery corresponding to the form of the tire-band. The tire-band is built into this channel and then bound round exteriorly to keep it under pressure while it is vulcanized. With tires of the lighter types such as those used for cycles there is comparatively little difficulty in removing them in band form from the mold but this process becomes very difficult with larger and stouter tires such as those used for motor cars, because the stouter fabric of such tires offers greater resistance to stretching and causes the tire to cling to the mold after it has been "unstuck" by the usual methods.

According to this invention, the method of manipulating rubber goods to place them on, or remove them from, a support which they closely fit consists in applying the open side of a vacuum-chamber to the goods, which chamber is fixed relatively to the goods and spaced away therefrom but has flexible or movable, or both flexible and movable lips to effect a seal between it and the goods, and then creating a vacuum or partial vacuum in the chamber so that part of the goods embraced by the sealing lips of the vacuum-chamber is moved toward the chamber away from the support.

For the purpose of manipulating "flat" tire-bands to remove them or place them on the periphery of a cylindrical support, the method may consist in covering the exposed side of the tire-band with an open sided vacuum-chamber having flexible or movable, or both flexible and movable lips to make a seal with the edges of the tire-band, exhausting the air from the chamber so that the band is flexed away from its support and finally withdrawing the support while the band is thus flexed away.

By a further step, this method can be extended to remove the tire-band from one support and place it on another, which further step consists in substituting another support for that which has been withdrawn after flexing the band away from it and then admitting air to the vacuum-chamber so that the band is allowed to contract on to the substituted support.

The invention further relates to apparatus for carrying out the above methods of manipulating "flat" tire-bands, which apparatus may be variously formed, as hereinafter described, and the novel features of which are pointed out in the claims appended to this specification.

In the accompanying drawings:

Fig. 3 is a section through one half of a modified form of annular vacuum-chamber showing the method of bringing the tire-band support into position;

Fig. 4 is a section through half of a tire-band and half of an annular tire-band support and a surrounding vacuum-chamber in position for operation;

Fig. 5 shows the same parts as in Fig. 4 but at a different stage of the operations.

Like reference characters indicate like parts throughout the drawings.

Figure 1:
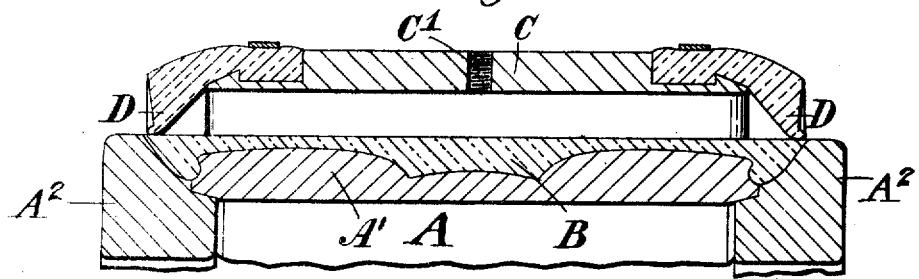
Figure 1 is a transverse section through one half of an annular form of apparatus for manipulating a tire-band.

A composite support designated generally by the letter A for the tire-band (Figs. 1 and 2) comprises a central annular portion A¹ and two side rings A² which are detachable from the said central portion. The cylindrical face of this composite support is shaped to give the requisite form to the tire-band B on that side which is covered with rubber, and for the purpose of the present invention, the support A may constitute the mold upon which the tire-band has been vulcanized. The wrapping which is placed around the tire-band while on the mold is removed and then the mold with the tire-band on it is introduced into the annular vacuum-chamber C. The vacuum-chamber is supported by any convenient means, and the mold is similarly supported by any convenient means in such manner as to lie centrally within the vacuum-chamber. The main wall of the vacuum-chamber is thus spaced away from the support A around the whole of its circumference and is held rigidly in relation thereto, but the edges of the wall are provided with inturned lips D of flexible material, such as rubber. These lips constitute jointing-rings which are made to bear upon the edges of the tire-band, as shown in Fig. 1 to effect a seal therewith. To introduce the mold, the lip on that side whereby the mold is brought into position may be temporarily held back by a ring J of larger diameter than the mold inserted in the lip, as shown in Fig. 3.

Figure 2:
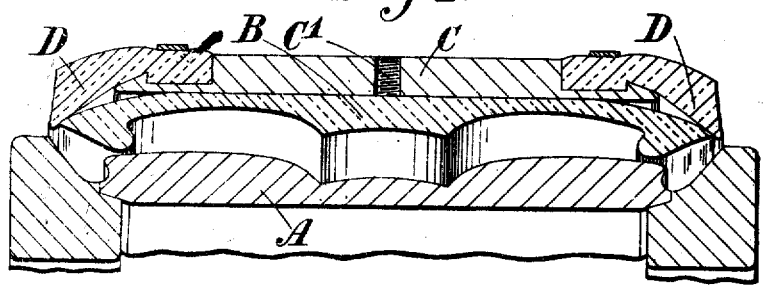
Fig. 2 is a similar view of the same apparatus with the parts in a different position.

Connection is made with the vacuum-chamber through a conduit G to exhaust-apparatus, not shown in the drawings, and when the parts are in the position shown in Fig. 1, the air is exhausted from the vacuum-chamber with the result that atmospheric-pressure forces the tire-band B into the position shown in Fig. 2, whereby the tire-band is flexed away from the mold enabling the latter to be withdrawn after removing that side ring $A^2$ which is on the trailing side during the withdrawing operation, that is, if the mold is to be withdrawn to the left as seen in Fig. 2, the side ring $A^2$ on the right will be first disconnected.

Where it is not desired to remove a side ring $A^2$, or where the support for the tire-band is such that it cannot be removed, the construction of apparatus such as is described in Figs. 3-5 may be employed. In this form of apparatus, the mold E is shown as having no detachable side-rings and the annular vacuum-chamber F is provided with specially shaped jointing-rings $F^1$. In each side face of the member F is a V-shaped groove $F^2$, and each jointing-ring extends across the groove on the side of the member F on which it is situated and projects beyond the same to provide the requisite sealing lip. The jointing-ring is shaped to fit into the groove $F^2$ but is molded so that it normally lies out of the groove though covering the opening of the same, and the flexible lips always lie beyond the groove so as to effect the requisite sealing with the tire-band. A conduit G is connected with exhaust-apparatus to enable the main vacuum-chamber to be exhausted, and conduits $G^1$ separately connect the grooves $F^2$ with exhaust-apparatus.

To enable the support E with the tire-band H thereon to be brought into position, a ring J may be temporarily inserted in the jointing-ring $F^1$ on that side at which the tire-band support is to be brought into position. This ring is of larger diameter than the support and the tire-band so that it holds the lip back, as shown in Fig. 3, to permit the easy introduction of the support. When the support is in place the parts take the position shown in Fig. 4 when it will be observed that the lips of the jointing-rings $F^1$ lie in contact with the edges of the tire-band H. Air is now exhausted from the main vacuum-chamber and if required, from the grooves $F^2$ also, which will cause the tire-band to be expanded away from the support E until it assumes approximately the position shown in Fig. 5. The support can then be removed without difficulty.

Instead of using a ring such as "J" to raise the lips for insertion of the support, air may be exhausted from the grooves $F^2$ whereupon the jointing-rings $F^1$ are drawn into the grooves, as shown in Fig. 5. The support can then be inserted without difficulty.

Figure 6:
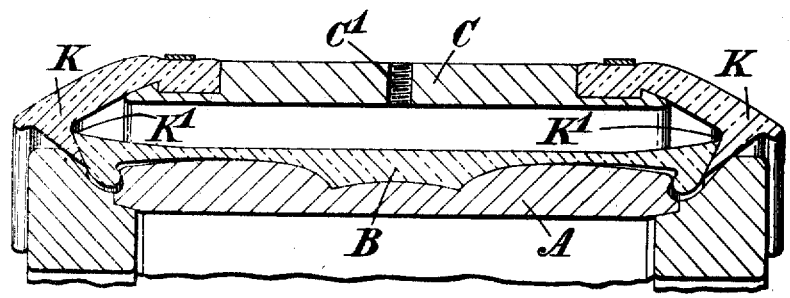
Fig. 6 is a transverse section through half of an annular tire-band and its support together with a modified form of vacuum-chamber.

In some cases it may be an advantage to cause the lips of the jointing-rings to engage the edges of the tire-bands at points between these edges and the face of the support which carries the band. For this purpose jointing-rings K (Fig. 6) are provided on the annular wall C of the vacuum-chamber, which rings are undercut on those sides toward each other, as shown at $K^1$. In using this form of apparatus the edges of the tire-band are pried up and the lips of the jointing-rings K are introduced between them and the wall of the support A prior to exhausting the vacuum-chamber.

This invention is not restricted to removing tire-bands from a cylindrical support, as by the same method and apparatus tire-bands can be first removed, say from the former upon which they are built up, by placing the former within the annular vacuum-chamber and operating the apparatus as has been described above, and then after the former has been removed a mold member may be introduced and the tire-band can be relaxed on to the mold. After vulcanizing, the same apparatus can be employed as has already been described for removing this tire-band from the mold.

Again the tire-band may, in some cases, be vulcanized on the inner periphery of an annular mold member, in which case it would be removed by a vacuum-chamber which would be placed within the mold and tire-band. The open wall of the vacuum-chamber will thus be on the cylindrical face of an interior member instead of on the inner periphery of a surrounding member.

Instead of using the jointing-rings D, F¹ or K, jointing-rings having a hollow base, such as are described in my co-pending patent application filed simultaneously herewith may be employed. It will be seen that such rings can be made sufficiently resilient to effect the necessary sealing with the edges of the tire-band and then when the latter is to be drawn completely away from its support, the inner peripheries of the jointing-rings can be expanded by exhausting the air from the hollow base of the jointing-rings. Also other forms of jointing-rings to give the desired expansion of lip could be designed.

In the case of tire-bands for heavy tires and when they are to be placed on a support, the seal between the annular member C or F and the tire-band may be effected without a preliminary support, that is the tire-band may be merely pushed into position within the annular member so that the sealing-lips engage the edges and then it can be expanded by exhausting the air in the chamber thus formed and the support on which it is to be placed introduced while it is in this expanded condition. Air can then be admitted to the chamber and the band will contract on to the support.

What I claim as my invention and desire to secure by Letters Patent is:

1. A method of removing an endless band, from a circular support which it surrounds or placing it thereon, consisting in pneumatically expanding the band by producing a pressure below atmospheric around its outer periphery and thereby flexing the band away from its center, moving the support or the expanded band axially in relation one to the other, and then establishing atmospheric pressure at the outer periphery of the band and thereby allowing the same to contract.

2. A method of removing a "flat" tire-band from a cylindrical support which it surrounds, consisting in pneumatically expanding the tire-band by producing a pressure below atmospheric around its outer periphery and thereby flexing the band away from the support, and withdrawing the support while the band is thus flexed away.

3. A method of manipulating "flat" tire-bands, that is to remove them from, or place them on the periphery of a cylindrical support, consisting in covering the exposed side of the tire-band with an open-sided vacuum-chamber having flexible lips to make a seal with the edges of the tire-band, exhausting the air from the chamber so that the band is flexed away from its support, and finally withdrawing the support while the band is thus flexed away.

4. A method of manipulating "flat" tire-bands, that is to remove them from, or place them on the periphery of a cylindrical support, consisting in covering the exposed side of the tire-band with an open-sided vacuum-chamber having collapsible lips to make a seal with the edges of the tire-band, exhausting the air from the chamber so that the lips are collapsed and the band is flexed away from its support, and finally withdrawing the support while the band is thus flexed away.

5. A method of transferring "flat" tire-bands from one support, such as a "former," to another, such as a "mold," consisting in closing the flexible annular mouth of an annular chamber by placing said band carried by its support against the lips of the chamber which effect a seal at the band, exhausting so much air out of said chamber that the band is stretched away from its support, withdrawing the liberated support from and placing a different support into the general plane of said band, and finally admitting air into said chamber and thereby causing the band to contract on to its substituted support.

6. A method of removing "flat" tire-bands from the periphery of a cylindrical support, consisting in inserting the annular flexible lips of the annular mouth of an annular chamber between the edges of the band and its support and thereby closing the mouth of the chamber with the band, exhausting so much air out of said chamber that the band is stretched from its support, and finally withdrawing the support while the band is thus stretched.

7. The combination, with a member having a cylindrical face recessed circumferentially to receive a band, of a second member concentric with the first, having a cylindrical face opposed to the recessed face of the first member and spaced away therefrom, one of said members having two annular grooves one in each of its sides, two annular jointing rings secured one on each side of the grooved member to close the grooves therein and arranged to enter said grooves under fluid pressure and having each a lip extending beyond the inner periphery of said grooved member to contact with the edges of said band and form a chamber with the member which carries it and with said band, a duct opening through said grooved member into said chamber for exhausting the air therefrom, and exhausting ducts opening one into each of said grooves.

8. The combination, with a member having a cylindrical face recessed circumferentially to receive a band, of a second member concentric with the first, having a cylindrical face also recessed circumferentially opposed to the recessed face of the first member and spaced away therefrom, one of said members having two annular grooves of V-section one in each of its sides, two annular jointing rings of V-section secured one on each side of the grooved member to close the grooves therein and arranged to enter said grooves under fluid pressure and having each a lip extending beyond the inner periphery of said grooved member to contact with the edges of said band and form a chamber with the member which carries it and with said band, a duct opening through said grooved member into said chamber for exhausting the air therefrom, and exhausting ducts opening one into each of said grooves.

9. The combination with a cylindrical support having a recessed outer periphery for receiving a band, of an annular member having a recessed inner periphery concentric with said support and spaced away therefrom, said support having two annular grooves one in each of its sides, two annular jointing-rings secured on said support one on each side of said member to close the grooves therein and arranged to enter said grooves under fluid-pressure, said rings having each a lip extending inward beyond the inner periphery of said member and arranged to contact with the edges of said band and form a chamber with said member and said band, a duct opening through said member into said chamber for exhausting the air therefrom, and exhaust ducts opening one into each of said grooves.

10. A method of removing an endless "flat" tire-band from its support consisting in covering the exposed side of the tire-band with an open-sided vacuum-chamber having flexible lips to make a seal with the edges of the tire-band, exhausting the air from the chamber so that the tire-band is expanded, removing the support from within the expanded tire-band and admitting air to the chamber to allow the tire-band to contract.

11. A method of placing an endless "flat" tire-band on a support consisting in covering the exposed side of the tire-band with an open-sided vacuum-chamber having flexible lips to make a seal with the edges of the tire-band, exhausting the air from the chamber so that the entire band is expanded, inserting the support within the expanded band and admitting air to the chamber so that the band is contracted on to the support.

12. Apparatus for manipulating an endless "flat" tire-band, that is to remove it from or place it on a support, comprising in combination an annular member of greater diameter than the tire-band which is to be manipulated, inwardly-directed sealing-lips of flexible material on the edges of the member which project inwardly a sufficient distance to seal with the tire-band and means for exhausting air from the chamber formed by the annular member with its lips and the tire-band.

13. A method of removing a "flat" tire band from a circular support which it surrounds or placing it thereon, consisting in expanding the band by subjecting it to greater fluid pressure on the inner side of the band than on the outer, flexing the band away from its center by this means, moving the support or the expanded band axially in relation one to the other and then reducing the pressure to which the band is subjected so that the latter is allowed to contract.

14. A method of removing "flat" tire-bands from the periphery of a cylindrical support or placing them thereon, consisting in engaging the annular flexible lips of the annular mouth of an annular chamber surrounding the tire-band with the inner peripheral edges of the tire-band and thereby closing the mouth of the chamber with the band, exhausting so much air out of said chamber that the band is stretched from its support and finally withdrawing the support while the band is thus stretched.

In testimony whereof I have signed my name to this specification.

THOMAS SLOPER.